(12) United States Patent
Young et al.

(10) Patent No.: US 6,604,658 B1
(45) Date of Patent: *Aug. 12, 2003

(54) REVERSIBLE SHANK FOR HITCH MOUNTED ACCESSORY CARRIERS

(75) Inventors: David A. Young, Plymouth, MI (US); David L. Hoelscher, Livonia, MI (US); Jacob S. Belinky, Carleton, MI (US); David A. Watch, Canton, MI (US); Gregory D. Richardson, Romulus, MI (US)

(73) Assignee: Metaldyne Company, LLC, Plymouth, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 09/668,756

(22) Filed: Sep. 22, 2000

(51) Int. Cl.[7] .................................................. B60R 9/00
(52) U.S. Cl. ........................ 224/521; 224/523; 224/531
(58) Field of Search .................. 224/521, 531, 224/509, 405, 524, 528, 503, 523; 29/DIG. 3, DIG. 29, DIG. 26

(56) References Cited

U.S. PATENT DOCUMENTS

| | | |
|---|---|---|
| 4,280,713 A | 7/1981 | Bruhn |
| 5,094,373 A * | 3/1992 | Lovci .......................... 224/282 |
| 5,190,195 A | 3/1993 | Fullhart et al. |
| 5,219,105 A | 6/1993 | Kravitz |
| 5,330,084 A | 7/1994 | Peters |
| 5,443,189 A | 8/1995 | Hirschfeld |
| 5,449,101 A | 9/1995 | Van Dusen |
| 5,476,279 A | 12/1995 | Klemstsen |
| 5,544,799 A | 8/1996 | Didlake |
| 5,593,139 A * | 1/1997 | Julian .......................... 224/521 |
| 5,722,678 A | 3/1998 | Hunger |
| D407,135 S * | 3/1999 | DeWitt ....................... D22/100 |
| 5,950,890 A | 9/1999 | Darby |
| 6,173,705 B1 * | 1/2001 | DeWitt ........................... 124/1 |

* cited by examiner

*Primary Examiner*—Stephen K. Cronin
*Assistant Examiner*—Maerena Brevard

(57) ABSTRACT

An accessory carrier assembly includes a reversible shank manufactured of a substantially square first portion and a substantially square second portion such that the first segment is preferably angled relative to the second segment. The first portion is sized to engage a first hitch receiver and the second portion is sized to engage a second hitch receiver. To attach the accessory carrier to the reversible shank, the first segment is located in amounting assembly either with or without the bushings depending on which type of hitch receiver is available. The accessory carrier can also be pivoted by removal of a single pin. The angle of the reversible shank forms a stop that contacts the accessory carrier to prevent over rotation of the accessory carrier and possible contact with the ground.

26 Claims, 3 Drawing Sheets

REVERSIBLE SHANK FOR HITCH MOUNTED ACCESSORY CARRIERS

BACKGROUND OF THE INVENTION

The present invention relates to a vehicle hitch assembly, and more particularly to a single reversible shank which allows the attachment of accessory carriers to variously sized hitch receivers.

It is often desirable to increase the capacity of a vehicle to transport cargo by providing a carrier assembly for carrying cargo on the outside of the vehicle. Various carrier racks exist that support cargo at various locations on a vehicle. Some carriers attach to receiver-type hitches available at the rear of many vehicles. Such carriers are easy to attach and can support substantial loads since they fit into a hitch designed specifically for quick attachment of trailers and the like.

Although many vehicles include a receiver-type hitch, at least two standard sizes of receiver-type hitches are commonly available on various vehicles. Further, as many types of carrier assemblies are available, particular combinations are often incompatible.

In addition, when a carrier is attached to a receiver hitch at the rear of a vehicle, it can inhibit access to the rear of a vehicle and can interfere with the opening of the trunk, tailgate or doors at the rear of the vehicle necessitating its removal from the vehicle whenever the trunk, tailgate or rear doors must be opened. This presents a significant disadvantage.

Accordingly, it is desirable to provide a carrier assembly which will fit a multiple of a receiver-type hitches without inhibiting access to the rear of a vehicle.

SUMMARY OF THE INVENTION

The accessory carrier assembly according to the present invention generally includes a reversible shank having a first segment and a second segment. The first segment is preferably angled relative to the second segment.

A first portion is sized to engage a first hitch receiver and a second portion is sized to engage a second hitch receiver. A 2-inch female hitch receiver and the 1.25-inch female hitch receiver are typical of most hitch receivers and the portions are preferably sized to engage these common receivers, however, other sized segments may be provided to provide engagement with a multiple of other sized female hitch receivers.

An accessory carrier includes a support and a mount assembly. The support is preferably a substantially L-shaped tubular support which defines a second axis substantially perpendicular to the first axis defined by the hitch receiver. The support provides for the attachment of a variety of accessory carriers. The carriers can include but are not limited to: bicycle racks; ski racks; snowboard racks; accessory shelves; accessory bustles; and the like. It should also be understood that other accessories attachable to a hitch receiver will benefit from the present invention.

When the accessory carrier is to be mounted to a vehicle having a 2-inch female hitch receiver, the first portion of the reversible shank is telescoped into the 2-inch female hitch receiver and retained therein by a hitch pin. To attach the accessory carrier to the reversible shank, the second segment is located in the mount assembly and a fastener is passed through one of a pair of apertures in the mount assembly and through one of a pair of apertures through the second portion.

As the second portion is smaller than the distance between the plates of the mount assembly, bushings are located between the plates and the second portion. A pin is then located through the other aperture in the first portion and the other aperture in the plates. The accessory carrier can also be pivoted on a pivot axis defined along the fastener by removing the pin. As the reversible shank is angled, it forms a stop that contacts the support to prevent over rotation of the accessory carrier and possible contact with the ground.

When the accessory carrier is to be mounted to a vehicle having a 1.25-inch female hitch receiver, the second portion of the reversible shank is telescoped into the 1.25-inch female hitch receiver and retained therein by a hitch pin. To attach the accessory carrier to the reversible shank, the first segment is located between the plates such that the pair of apertures located through the plates are aligned with a pair of apertures located through the second segment. Because the second segment is large enough to fit between the plates at both apertures, the bushings are not required. The accessory carrier can again be pivoted and clearance is again provided for accessories carried on the accessory carrier.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
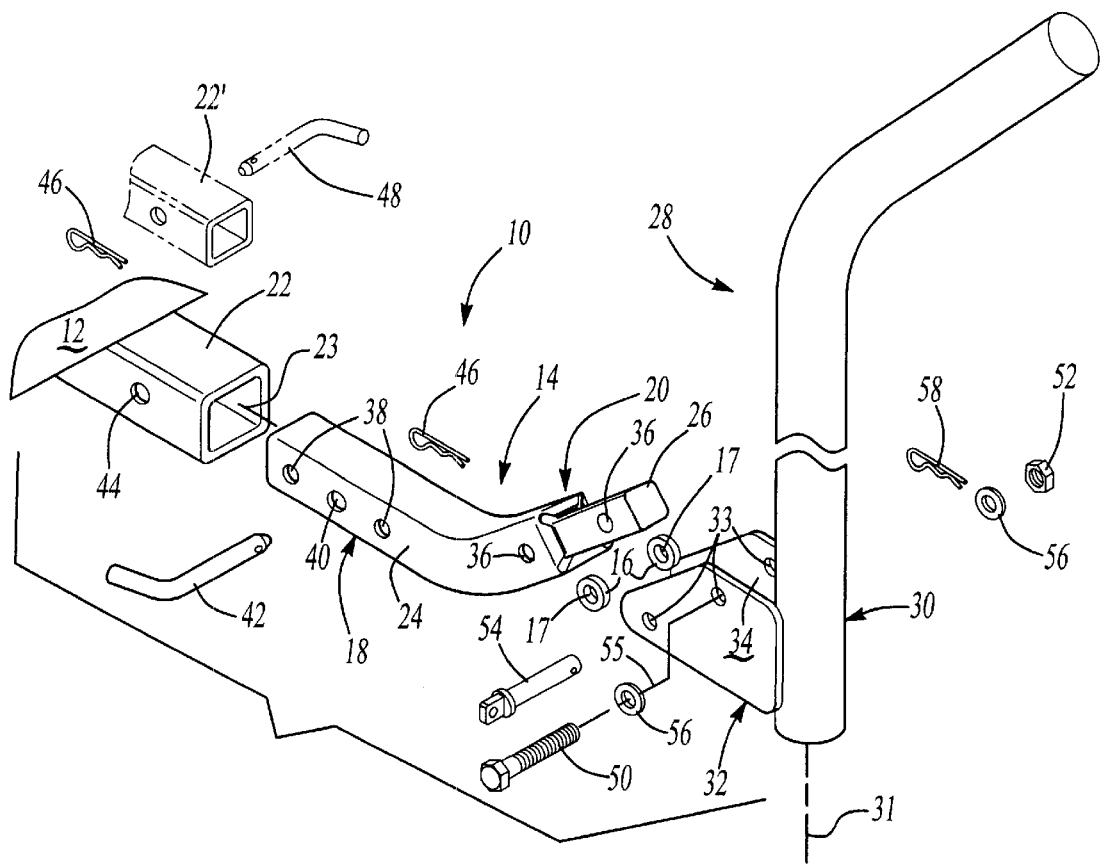
FIG. 1 is an exploded view of a reversible shank assembly for attachment to a plurality of vehicle hitch receivers according to the present invention.

FIG. 1 illustrates an accessory carrier assembly 10 for attachment to a vehicle (shown rather schematically at 12). The carrier assembly 10 generally includes a reversible shank 14, and bushings 16. The reversible shank 14 includes a first segment 18 and a second segment 20. Each segment 18,20 provides exterior dimensions for mating engagement to a first and second female hitch receiver 22 or 22' mounted to the vehicle 12 and to an accessory carrier 28. The hitch receivers 22,22' are mounted to the vehicle in a known manner and each defines a first axis 23.

The reversible shank 14 is preferably manufactured of a substantially square first portion 24 which receives a substantially square second portion 26. First portion 24 is locally reduced in size, such as by bending, to receive second portion 26 which is fixed therein by welding or the like. The first segment 18 is angled, preferably at 45 degrees, relative to the second segment 20. It should be understood that locating the angle at various points along the reversible shank 14 which will provide advantages to many other hitch receivers and accessory carriers.

Preferably, the first portion 24 is sized to engage a 2-inch female hitch receiver 22 and the second portion 26 is sized to engage a 1.25-inch female hitch receiver 22'. The 2-inch female hitch receiver 22 and the 1.25-inch female hitch receiver 22' are typical of most female hitch receivers and portions 24,26 are preferred sized to engage these common receivers, however, other sized portions may be provided for engagement with a multiple of other sized female hitch receivers.

The accessory carrier 28 includes a support 30 and a mount assembly 32. The support 30 is preferably a substantially L-shaped tubular support which defines a second axis 31 substantially perpendicular to the first axis 23. The support 30 provides for the attachment of a multiple of known carriers (not shown). The carriers can include but are not limited to: bicycle racks; ski racks; snowboard racks; accessory shelves; accessory bustles; and the like. It should also be understood that other accessories attachable to a hitch receiver 22 will benefit from the present invention.

The mount assembly 32 preferably includes a pair of parallel plates 34 fixedly attached to the support 30 by welding or the like. Other accessories attachable to a hitch receiver 22 can directly include the mount assembly 32 such that the other accessories will benefit from the present invention. A distance sized to receive the larger first portion 24 of the reversible shank 14 separates the plates 34. A pair of apertures 33 are located through each of the plates 34 and form a row oriented at approximately a 45-degree angle relative to the second axis 31.

The second segment 20 of the reversible shank 14 includes a pair of apertures 36. Preferably one of the apertures 36 is located through the first portion 24 and the other aperture 36 is located through the second portion 26. The pair of apertures 36 are spaced to correspond with the pair of apertures 33 located through the plates 34 such that the first segment 18 of the reversible shank 14 is attachable thereto.

The first segment 18 of the reversible shank 14 includes a pair of apertures 38. The pair of apertures 38 are spaced to correspond with the pair of apertures 36 and the pair of apertures 33 located through the plates 34 such that the first segment 18 of the reversible shank 14 is also attachable thereto. Preferably, a hitch pin aperture 40 is located between the pair of apertures 38 to receive a hitch pin 42 in a known manner.

The first portion 24 is telescopically receivable within the 2-inch female hitch receiver 22 and retained therein by the hitch pin 42. Hitch pin 42 is preferably passable through a hitch aperture 44 and through the corresponding hitch pin aperture 40. Hitch pin 42 is retained by a fastener 46 such as clip 46. The hitch pin aperture 40 is provided as the hitch pin 42 for the 2-inch female hitch receiver 22 is typically of a larger diameter than a hitch pin 48 for the 1.25-inch female hitch receiver 22'. Accordingly, the pairs of apertures 32,36, and 38 are preferably of an equivalent size which may be smaller than hitch pin apertures 40 and 44.

When the accessory carrier 28 is to be mounted to a vehicle 12 having a 2-inch female hitch receiver 22, the first portion 24 of the reversible shank 14 is telescoped into the 2-inch female hitch receiver 22 and retained therein by the pin 42. To attach the accessory carrier 28 to the reversible shank 14, the second segment 20 is located between the plates 34 such that the pair of apertures 33 located through the plates 34 are aligned with the pair of apertures 36 located through the second segment 20. A fastener 50 is preferably passed through one of the apertures 33 and through one of the apertures 36 located through the second portion 26.

Preferably, because the second portion 26 is smaller than the distance between plates 32, the bushings 16 are preferably located between the plates 34 and the second portion 26. Each of the bushings 16 includes an aperture 17 such that the bushings 16 can receive and be retained by the fastener 50 which is passed therethrough. A threaded fastener 52 such as nut 52 is then threaded to the fastener 50 to retain the accessory carrier 28 to the reversible shank 14. Washers 56 are preferably located between the fastener 50, nut 52 and the plates 34 such that the accessory carrier 28 can be easily pivoted on a pivot axis 55 defined along fastener 50.

A pin 54 is then located through the other aperture 36 in the first portion 24 and the other aperture 33 in the plates 34. A clip 58 or the like retains pin 54 to the mount assembly 32. It should be understood that the pin 54 can be another hitch pin 48 for the 1.25-inch female hitch receiver 22' or can be a separate pin such as pin 54.

Figure 2:
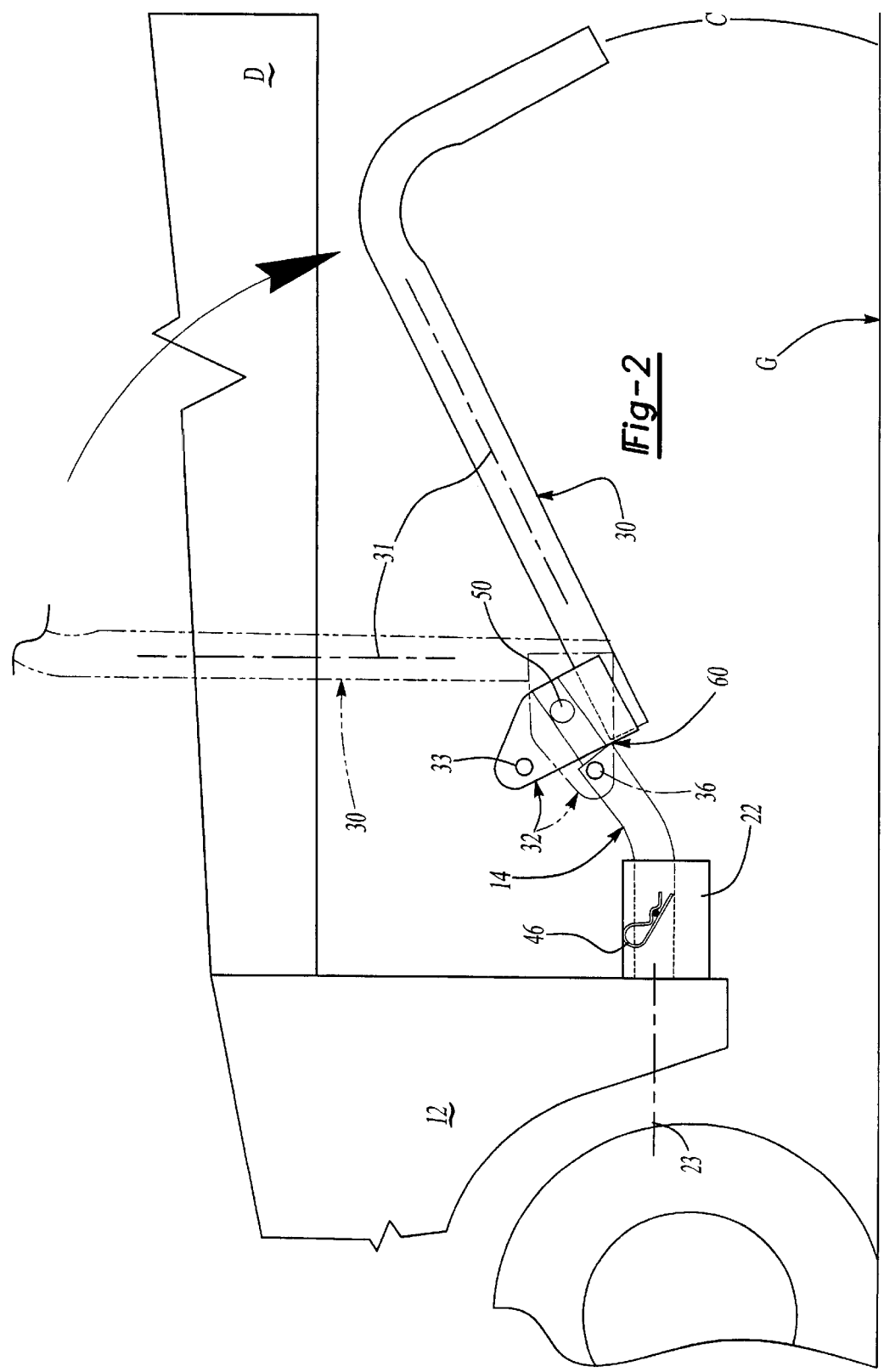
FIG. 2 is a perspective partial phantom view of the reversible shank assembly illustrated in a pivoted position relative to a vehicle hitch receiver.

Referring to FIG. 2, the accessory carrier 28 is now mounted to the vehicle 12 such that the second axis 31 is substantially perpendicular to the first axis 23 (shown in phantom). Importantly, should a user require access to the vehicle 12 through a rear door, lift-gate, or the like (shown schematically at D), only pin 54 need be removed. The accessory carrier 28 can then be pivoted on the pivot axis 55 (FIG. 1) defined along fastener 50. As the reversible shank 14 is angled, the reversible shank 14 forms a stop 60 that contacts the support 30 to prevent over rotation of the accessory carrier 28 and possible contact with the ground G. Accordingly, the reversible shank 14 provides a clearance C for accessories carried on the accessory carrier 28 that otherwise would not be provided if the reversible shank was straight. Further, by adjusting the angle of the reversible shank 14, the clearance C relative to the ground and the vehicle can be adjusted.

Figure 3:
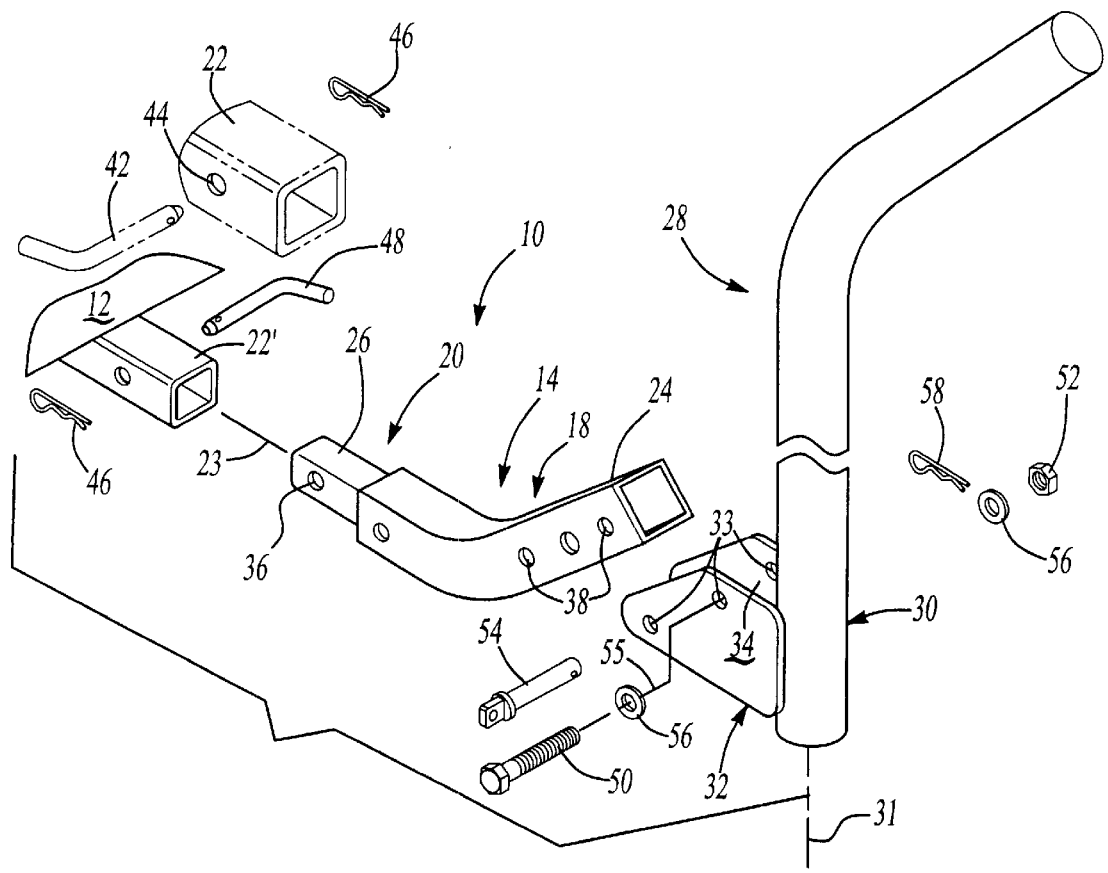
FIG. 3 is an exploded view of the reversible shank assembly of FIG. 1 illustrated in a second position for attachment to a second vehicle hitch receiver.

Referring to FIG. 3, when the accessory carrier 28 is to be mounted to a vehicle 12 having a 1.25-inch female hitch receiver 22', the second portion 26 of the reversible shank 14 is telescoped into the 1.25-inch female hitch receiver 22' and retained therein by the pin 48. To attach the accessory carrier 28 to the reversible shank 14, first segment 18 is located between the plates 34 such that the pair of apertures 33 located through the plates 34 are aligned with the pair of apertures 38 located through the second segment 20. Because the second segment 20 is large enough to fit between the plates 34 at both apertures 38, bushings 16 are not required. Otherwise, assembly is the same as described above. The accessory carrier 28 can again be pivoted and clearance is again provided for accessories carried on the accessory carrier 28.

In one method of manufacturing the reversible shank 14, apertures 36,38 and 40 a drilled through the first portion 24 and second portion 26. The first portion 24 is then crimped to receive the second portion 26 at one end and bent along its length to obtain the desired angle. Finally, the second portion 26 is inserted into the first portion 24 and welded in place.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A reversible shank assembly for attachment to a plurality of vehicle hitch receivers comprising:
   a first segment having a first aperture;
   a second segment having a second aperture, said second segment angled relative to said first segment and said second segment permanently fixed to said first segment, said first aperture and said second aperture substantially concentric;
   said first segment comprising a first portion telescopically engageable within a first hitch receiver;
   said second segment comprising a second portion extending from said first portion, said second portion of a different size in cross section than said first portion, said second portion telescopically engageable within a second hitch receiver; and
   a pair of bushings sized to fit between a pair of plates and said second portion.

2. The shank as recited in claim 1, wherein said first portion is substantially square in cross section and said second portion is substantially square in cross section, said second portion fixedly telescoped from within said first portion.

3. The shank as recited in claim 1, wherein said first segment includes a third aperture located between a first pair of apertures.

4. The shank as recited in claim 1, wherein said second segment is angled at 45 degrees relative to said first segment.

5. The shank as recited in claim 1, wherein each of said pair of bushings includes an aperture of a diameter substantially equivalent to said first and second pair of apertures.

6. The shank as recited in claim 1, wherein said second segment is angled at an angle less than 90 degrees relative to said first segment.

7. The shank as recited in claim 1, wherein said first hitch receiver is of a size in cross section different than said second hitch receiver.

8. The shank as recited in claim 1, wherein said second segment comprises a solid shank.

9. The shank as recited in claim 1, wherein said second hitch receiver is of a size in cross section different than said first hitch receiver.

10. A carrier assembly for attachment to a plurality of vehicle hitch receivers comprising:
    a reversible shank assembly for telescopic insertion within a plurality of hitch receivers, said reversible shank including a first segment having a first aperture, and a second segment having a second aperture, said second segment angled relative to said first segment, said first aperture and said second aperture substantially concentric;
    said first segment comprising a first portion telescopically engageable within a first hitch receiver;
    said second segment comprising a second portion extending from said first portion, said second portion of a different size in cross section than said first portion, said second portion telescopically engageable within a second hitch receiver; and
    a mount assembly including a pair of plates separated by a width defined by said first portion, said mount assembly comprising a third pair of apertures corresponding to said first and second aperture.

11. The carrier assembly as recited in claim 10, wherein said first portion is substantially square in cross section and said second portion is substantially square in cross section, said second portion fixedly telescoped from within said first portion.

12. The carrier assembly as recited in claim 10, wherein said first segment includes a third aperture located between a first pair of apertures.

13. The carrier assembly as recited in claim 10, wherein said second segment is angled at 45 degrees relative to said first segment.

14. The carrier assembly as recited in claim 10, further comprising a support attached to said mount assembly, the plurality of vehicle hitch receivers defining a first axis and said support defining a second axis, said first axis oriented substantially parallel to said second axis.

15. The carrier assembly as recited in claim 14, wherein said third pair of apertures are oriented at approximately 45 degrees relative to said first axis.

16. The carrier assembly as recited in claim 14, further comprising a fastener passable through one of said third pair of apertures, said fastener defining a pivot axis such that said support is rotatable relative to said mount assembly at said pivot axis.

17. The carrier assembly as recited in claim 16, wherein said reversible shank assembly operates as a stop to limit rotation of said support relative to said mount assembly.

18. The carrier assembly as recited in claim 16, wherein said fastener is a threaded bolt.

19. The carrier assembly as recited in claim 14, further comprising a pin passable through one of said third pair of apertures.

20. The carrier assembly as recited in claim 10, further comprising a pair of bushings, said pair of bushings sized to fit between said pair of plates and said second portion.

21. The carrier assembly as recited in claim 20, wherein each of said pair of bushings includes an aperture of a diameter substantially equivalent to said third pair of apertures.

22. The shank as recited in claim 10, wherein said second segment is angled at an angle less than 90 degrees relative to said first segment.

23. The shank as recited in claim 10, wherein said first hitch receiver is of a size in cross section different than said second hitch receiver.

24. A method of manufacturing a reversible shank comprising the steps of:
    (1) drilling a plurality of apertures in a first portion and a second portion;
    (2) bending the first portion to a predetermined angle;
    (3) crimping an end of the first portion; and
    (4) telescopically fitting and welding the second portion into the first portion.

25. A carrier assembly for attachment to a plurality of vehicle hitch receivers comprising:
    a reversible shank assembly for telescopic insertion within a plurality of hitch receivers, said reversible shank including a first segment having a first aperture, and a second segment having a second aperture said second segment angled relative to said first segment, said first aperture and said second aperture substantially concentric;
    said first segment including a first portion telescopically engageable within a first hitch receiver;
    said second segment including a second portion extending from said first portion, said first and said second portion substantially square in cross section, said second portion fixedly telescoped from within said first portion, said second portion telescopically engageable within a second hitch receiver; and a mount assembly including a pair of plates separated by a width defined by said first portion, said mount assembly comprising a third pair of apertures corresponding to said first and second aperture.

26. The shank as recited in claim 25, wherein said second segment comprises a solid shank.

* * * * *